United States Patent Office 3,213,912
Patented Oct. 26, 1965

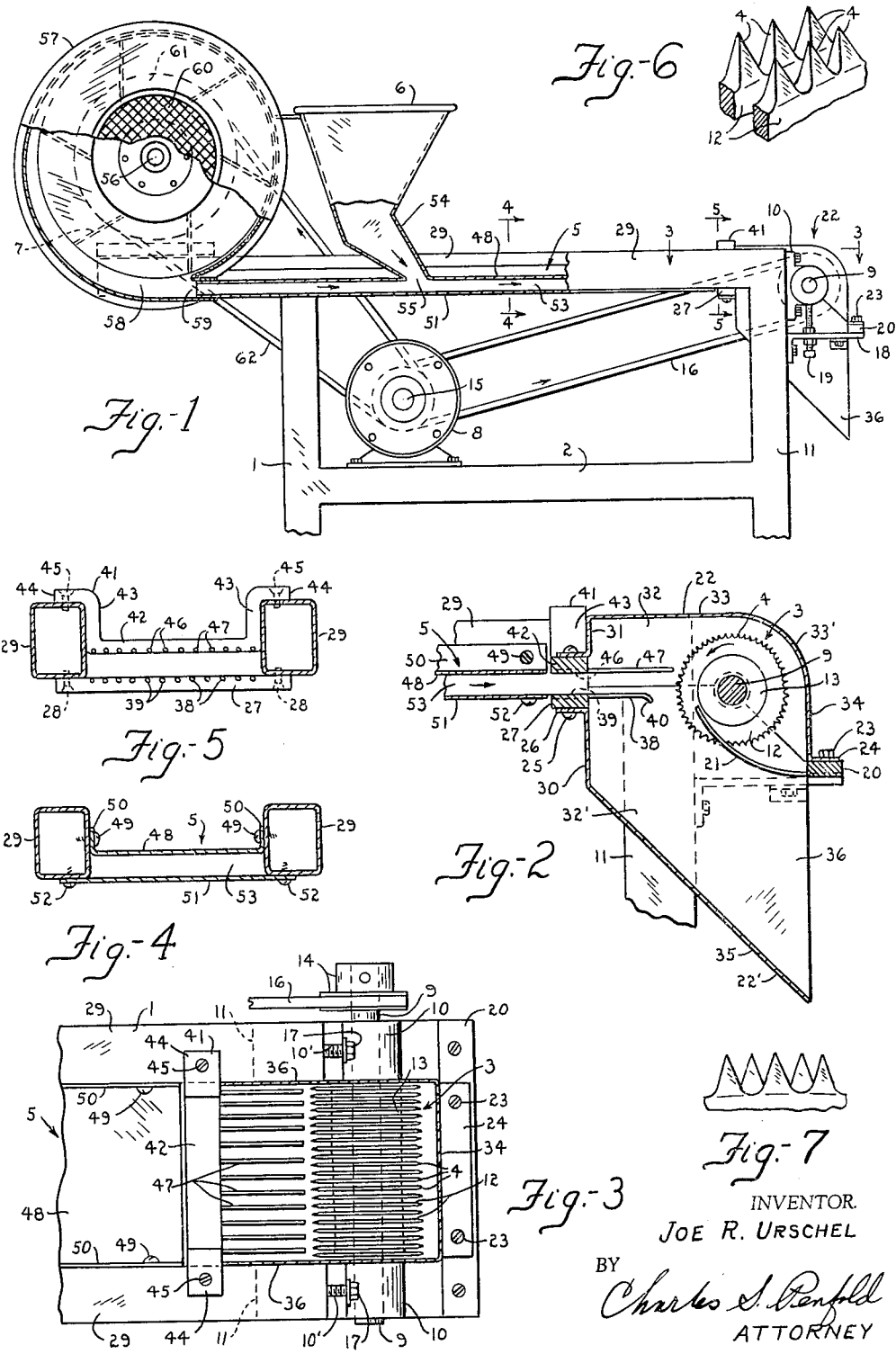

3,213,912
MACHINE AND METHOD OF PIERCING
PRODUCTS
Joe R. Urschel, 202 Michigan Ave., Valparaiso, Ind.
Filed Oct. 25, 1962, Ser. No. 232,978
10 Claims. (Cl. 146—242)

The subject invention relates generally to means for conditioning a product and more particularly is directed to a machine and method for conditioning certain food products, such as cranberries, peas, beans and the like, by penetration to improve their processing or utility.

It has proven desirable to penetrate or pierce the skins of such fruits and vegetables to improve their processing. When the skins of peas or beans are pierced, for example, they may be dried more rapidly, and when it comes time to cook them, soaking in water prior to cooking is not necessary. With cranberries and some other fruits, if the skins are pierced before cooking, the pectins will flow into solution quickly, thereby reducing the time required for cooking.

It is recognized that various machines have heretofore been constructed for piercing such products. Some of the machines include a pair of spaced rolls rotating in opposite direction, with one of the rolls forcing the product onto points provided on the other roll, while in other machines a conveyor belt carries the product and forces it against points provided on an overhead rotatable roll. Machines of the aforesaid and like character have not proven entirely satisfactory for the reason that the force exerted to push or drive the product onto the points causes the product to become crushed or distorted to some extent. In such machines, if the product varies in size, the larger sizes are pierced to greater depths while the smaller sizes may not be pierced to a sufficient depth. Also, if a product is not round, such as a kidney bean, greater variations in the depth of piercing will occur and may cause some crushing.

With the foregoing in mind, the principal object of the subject invention is to overcome the disadvantages or difficulties which are inherent in the machines, above described, by utilizing a fluid, such as a stream of air, to carry or direct products of the above character onto points carried by a movable support, such as a rotatable structure. With this setup, when the product is gently brought up to an appropriate speed or flow and impinged upon the points, the inertia of the product produces the force for piercing and distortion of the product will be appreciably less than if external forces are applied to it, such as by a roller or belt, as alluded to above. By employing a stream of fluid, such as air, for conducting a product which varies in size, the larger sizes will have greater inertia due to their increased weight, but since they will strike a greater number of points, the depth of penetration will not vary materially from the smaller sizes that may engage but a single point. Furthermore, if the product is not round, the depth of piercing will not vary greatly even though the product is pierced on its end or on a side.

Accordingly, one of the principal objects of the subject invention is to provide a machine and method whereby damage or distortion of the product is held to a minimum while it is being pierced and whereby at least a portion of the surface area of the product, irrespective of its variation in size, will be efficiently pierced or penetrated, within practicable limits, to a predetermined depth.

Additional objects of the invention reside in offering advantages with respect to efficiency, manufacture and assembly, adjustability, speed of operation, and synchronizing of the fluid stream producing means and the movable piercing structure.

Other objects and advantages of the invention will become apparent after the description hereinafter set forth is considered in conjunction with the drawings annexed hereto which exemplify one embodiment of the invention.

In the drawings:

FIGURE 1 is a front elevational view of the machine, with portions thereof broken away to illustrate certain construction;

FIGURE 2 is an enlarged partial vertical section of the machine depicting details of the operative relationship between a roller structure and a guide means;

FIGURE 3 is an enlarged partial horizontal section taken substantially on line 3—3 of FIGURE 1;

FIGURE 4 is an enlarged partial vertical section taken substantially on line 4—4 of FIGURE 1;

FIGURE 5 is an enlarged partial vertical section taken substantially on line 5—5 of FIGURE 1;

FIGURE 6 is an enlarged perspective view of a portion of the roller structure illustrating details of the points provided thereon; and FIGURE 7 is an enlarged perspective view of a portion of modified roller structure illustrating a different arrangement of points thereon.

The organization exemplified in the drawing comprises, among other things, a frame 1 provided with a shelf 2, a roller, movable or rotatable structure generally designated 3 provided with a plurality of points 4, a guide means designated 5 spaced a predetermined distance from the roller structure, a hopper 6, a fan 7, and a power unit in the form of an electric motor 8 mounted on the shelf 2 and operatively connected to the roller structure and the fan whereby a product when introduced into the hopper will fall into the guide means for transmission therethrough on a ribbon or stream of air, produced by the fan, for discharge and impingement on the points for penetration thereby.

The roller or piercing structure 3 may be designed and constructed in various ways. As illustrated herein, it is comprised of a horizontal shaft 9 journalled at its ends in a pair of bearings 10 connected to rear legs 11 of the frame. The structure 3 also includes a plurality of serrated discs 12 which are keyed to the shaft and uniformly axially spaced apart thereon by annular spacers 13 as shown in FIGURES 2 and 3. A pulley 14 is fixed on the shaft and operatively connected to one of a pair of pulleys fixed on a drive shaft 15 of the motor 8 by a belt 16 for rotating the structure. As will be observed in FIGURE 6, each of the discs is preferably serrated by providing its periphery with a plurality of projections having the points 4 thereon which are equally spaced apart circumferentially. The points or teeth on each disc are also preferably bevelled and aligned with the points on the other discs, but, if desired, the discs may be arranged as shown in FIGURE 7 so that points on certain of the discs are staggered with respect to points on other discs. It is to be understood that the shape and disposition of the points may be varied on the roller structure and that structures or units with different points may be utilized. For example, one kind of product may be conditioned with a structure having points of a particular shape while other kinds can be more efficiently penetrated with a structure provided with points of a different character.

The bearings 10 which support the shaft 9 are preferably provided with slots 10' which receive screws 17 to permit vertical adjustment of the rotatable structure relative to the guide means 5. A pair of brackets 18 are attached to the rear legs of the frame below the structure 3 and carry screws 19 for engaging the bearings 10 to facilitate their adjustment. A horizontal bar 20 is attached to the outer free ends of the brackets and a plurality of curved resiliently flexible fingers 21 are carried by the bar and extend upwardly in between the discs in close relation to the spacers 13 as depicted in FIGURES 2 and 3. It is to be noted that the curvature of the fingers is such that any product impinged on the points will be gradually cammed or moved outwardly from the points and discs at locations relatively close to and below the path travelled by the product prior to penetration. Otherwise expressed, the fingers begin to strip the product from the points following its penetration.

A hood 22 and a chute 22' are provided for the roller structure 3 and detachably mounted on the frame. The hood has a flange 23 through which screws 24 extend into the bar 20 and screws 25 extend through a flange 26 on the chute into a lower horizontal cross support 27. This support 27 is attached by screws 28 to the underside of a pair of upper parallel rails 29 of the frame as illustrated in FIGURES 2 and 5. The hood and chute may be constructed in various ways. As shown, they both are disposed between the rear legs of the frame and include aligned vertical front walls 30 and 31 and aligned parallel side walls 32 and 32'. The hood also includes an upper horizontal wall 33 and a curved wall 33' respectively arranged above and about the structure 3 and a rear vertical wall 34. The chute also includes an inclined or sloping wall 35 which assists in directing the conditioned or penetrated product through an outlet 36, formed by the chute, and away from the machine into a container (not shown) therebelow. The use of a hood and chute is desirable as it serves to promote sanitation by generally confining the processing operation of the product in a predetermined area.

The lower cross support 27, above referred to, and shown in FIGURES 2 and 5, is preferably provided with a plurality of parallel elongate elements 38. The elements are preferably in the form of resiliently flexible rods of circular cross-section and certain of their extremities are fixed in parallel grooves 39 provided in the upper portion of the support 27 so that their opposite extremities are unsupported or freely extended toward and on a level or plane generally with that of the axis of the shaft 9. The free ends of these elements are preferably downturned to some extent as indicated at 40 so as to provide clearance for the impinged product as it is carried downwardly when the structure 3 is rotated in a counter-clockwise direction as indicated by the arrow in FIGURE 2. These downturned ends may also serve to prevent the product from being caught thereon.

As depicted in FIGURES 2, 3 and 5, the machine is also provided with an upper bar support 41 similar to the support 27. The support 41 has a horizontal portion 42 disposed between the upper rails 29 of the frame, a pair of upturned parallel portions 43 and outturned offsets 44, the latter of which are supported in overlapping engagement with the rails by screws 45. The underside of the support 41 is provided with parallel grooves 46 with certain extremities of elongate resiliently flexible elements 47 fixed therein so that opposite free extremities thereof extend in a plane parallel to the lower elements and toward the structure 3 on a level or plane above the axis of the shaft 9. It will be observed that the upper bank of elements 47 are somewhat longer than the lower bank of elements and closer to the rotatable structure to insure movement of the product to the rotatable structure; that the upper and lower elements are vertically aligned; and that the vertical and horizontal spacings between the elements are respectively uniform and predetermined whereby to assist in controlling or guiding the flow of the product against the structure 3 while allowing air to freely escape at the end of the guide means and thereby enable the product to fly substantially freely by its own inertia for penetration. This factor is important because the product is more or less in free flight from the time it leaves the guide means until it engages the points on the structure 3 and is thereby cushioned or eased against the points. With such an organization, the product substantially retains its original shape or identity while being pierced, as distinguished from those conventional machines above described which tend to excessively squeeze or mash the product during penetration.

The guide means 5 may be designed and constructed in various ways but as exemplified herein comprises an elongate upper horizontal planar panel or wall 48 detachably secured between the upper frame rails 29 by means of screws 49 extending through upturned parallel flanges 50 formed on the panel. The guide means also includes a lower horizontal planar panel or wall 51 detachably secured by screws 52 in abutting relation with under surfaces of the rails in a predetermined spaced parallel relation to the upper panel to provide a guideway 53 or path having predetermined vertical and longitudinal dimensions. The inside cross dimensions of the guideway 53 may be of a size ¾" x 6", the purpose of which is to bring a product, such as peas, to a uniform velocity. It will be observed that the vertical dimension between the opposed surfaces of the supports 27 and 41 and the lower and upper banks 38 and 47 of the elements substantially correspond to the vertical dimension between the panels of the guide means and generally constitute continuations thereof. It will also be observed that the size of the guideway 53 and the size of the pointed area of the rotatable structure is predetermined. Although the rails 29 of the frame, as shown, constitute side walls of the guide means it is to be understood that a separate duct may be utilized.

The hopper 6 is preferably of a width substantially corresponding to that of the guide means and includes an inclined chute 54 which is secured to the upper panel of the guide means so that an outlet 55 formed by the chute causes the product to merge into a stream of air forced through the guide means by the fan 7. In other words, an inclined layer of the product is introduced or presented into the stream of air.

The fan or pump 7 is of a conventional centrifugal, low pressure, high volume type and is carried by a horizontal shaft 56 mounted in a housing 57. This housing is preferably supported on a frontal overhanging part 58 of the frame and provided with a tubular duct 59 which telescopically receives the front edge portions of the panels of the guide means so that rotation of the fan will cause air entering the housing through a screened inlet 60 to flow at a predetermined velocity and carry a layer of the product in a ribbon or steam of air to and across the length of the piercing structure 3. The shaft of the fan is provided with a pulley 61 operatively connected by a belt 62 to the other one of the two pulleys, above referred to, which are fixed on the drive shaft 15 of the motor. The operative connections of the fan and roller structure with the motor are synchronized so that bare points on the structure will always be presented to the product being carried or shot by the air stream thereto. In other words, the product that is impinged on the points is carried downwardly and away from the air stream with sufficient speed to prevent the product that is following from flying against that which has been pierced. Attention is directed to the important fact that the relationship of the guide means and the roller structure is preferably such that the product in the stream of air moves in a direction or path which is generally above the axis of the shaft 9 so that bare points of the roller structure will always be moving in an arc into the air stream and thereby promote the piercing action. Otherwise expressed, the product as released from the guide means is directed broadwise and chordally against the piercing structure, the latter of which continuously presents points moving toward the product.

In view of the foregoing it will be manifest that the above described structure offers a unique method whereby the inertia of the product causes the force for piercing and that this serves to reduce distortion of the product and particularly those which are relatively soft. Also, by utilizing a stream or ribbon of air, products of larger size will carry greater inertia due to their increased weight, but since they will strike a greater number of points due to their larger area, the depth of the piercing will not vary greatly from the smaller sizes that may strike only one point. Moreover, if the product is not round, the depth of the piercing will not vary greatly regardless if the product is pierced on its end or on its side.

It will also be apparent that the speeds of the force producing means and piercing structure and adjustability of the latter may be varied so that the machine will accommodate different kinds of products.

It is to be understood that water or other flowable substances may be substituted for air in the operation of the machine.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A machine for conditioning products of the kind described, said machine comprising a frame, a rotatable structure mounted on said frame and provided with a point for penetrating the product, means for receiving and directing the product to said structure, and means providing a stream of fluid for forcibly carrying the product through said receiving means in a predetermined path and unsupported through space for engagement with said point.

2. The machine defined in claim 1 in which said rotatable structure is spaced from said receiving means and a plurality of longitudinal elements are disposed in relation to said space above and below said path.

3. A machine for conditioning a quantity of a product of the kind described comprising a rotatable structure provided with a plurality of external means for penetrating the product when directed thereagainst, means disposed in spaced relation to said rotatable structure for receiving and guiding the product thereto, a hopper communicatively connected to said receiving means whereby the product may be fed thereto, and means communicating with the interior of said receiving means whereby a stream of fluid will forcibly carry the product substantially longitudinally therethrough and unsupported through space into direct engagement with said external means.

4. In combination: structure provided with a plurality of individual pointed means for penetrating a product, and means for shooting a product through space toward said structure for impingement on one or more of said pointed means for interrupting its flight, and means for automatically removing the product from said pointed means.

5. A method of conducting a product which comprises shooting the product in a predetermined direction through space for impingement on one or more pointed means for interrupting the flight of the product, and then automatically removing the impinged product from said pointed means.

6. A method of conditioning a food product which comprises introducing the product into a stream of fluid for movement thereby in a predetermined direction for direct impingement upon one or more pointed means whereby to interrupt the travel of the product, and then automatically removing the impinged product from said pointed means.

7. A machine of the kind described comprising a frame, a structure movably mounted on said frame and provided with a plurality of closely associated pointed means, a guide supported on said frame in spaced relation to said structure, a hopper for feeding a plurality of relatively soft substantially round or oblong items to said guide, means disposed in the space between said structure and said guide assisting to direct the items in a substantially longitudinal path to said structure, and fluid means for forcibly carrying the items through the guide and unsupported through space for direct impingement on one or more of said pointed means for effecting partial penetration thereof.

8. In combination: a frame, a movable structure provided with a plurality of points thereon, elongate guide means spaced from said movable structure, a product receiving hopper mounted in relation to said guide means for feeding the product thereto, means for forcing a fluid through said guide means for conveying the product therethrough and projecting it into the space between said movable structure and said guide means for impingement on said points, means for synchronizing the operation of said movable structure and said forcing means, and means whereby the impinged product is automatically released from said points.

9. The combination defined in claim 8, including means disposed in relation to said guide means and said movable structure assisting to control the flow of the product through said space.

10. In combination: a frame, rotatable cylindrical structure mounted on said frame and provided with points on its periphery, an elongate guide means mounted relative to said frame and defining a guideway for a product, a hopper for feeding the product into said guideway, and fluid means for forcing a layer of the product through said guideway in a chordal substantially straight direction and unsupported through space broadside against said points.

References Cited by the Examiner

UNITED STATES PATENTS

| 332,006 | 12/85 | St. Requier | 241—275 X |
|---|---|---|---|
| 1,069,946 | 8/13 | Harrison | 146—56 |
| 2,178,920 | 11/39 | Savery | 146—241 X |
| 2,956,838 | 10/60 | Thoresen. | |
| 2,979,094 | 4/61 | Tokimoto | 146—56 |
| 3,027,925 | 4/62 | Gronberg. | |
| 3,058,674 | 10/62 | Kocher | 241—275 X |
| 3,080,905 | 3/63 | Noren | 146—9 X |

J. SPENCER OVERHOLSER, *Primary Examiner.*